(12) United States Patent
Sakaguchi et al.

(10) Patent No.: US 9,189,848 B2
(45) Date of Patent: Nov. 17, 2015

(54) MEDICAL IMAGE PROCESSING APPARATUS, MEDICAL IMAGE PROCESSING METHOD AND X-RAY IMAGING APPARATUS

(71) Applicants: Kabushiki Kaisha Toshiba, Tokyo (JP); Toshiba Medical Systems Corporation, Otawara-shi (JP)

(72) Inventors: Takuya Sakaguchi, Utsunomiya (JP); Kyojiro Nambu, Nasushiobara (JP); Shingo Abe, Nasushiobara (JP); Kunio Shiraishi, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 43 days.

(21) Appl. No.: 13/751,728

(22) Filed: Jan. 28, 2013

(65) Prior Publication Data
US 2013/0195343 A1 Aug. 1, 2013

(30) Foreign Application Priority Data
Feb. 1, 2012 (JP) ................................. 2012-020391

(51) Int. Cl.
*G06T 7/00* (2006.01)
*G06T 5/00* (2006.01)

(52) U.S. Cl.
CPC ............ *G06T 7/0014* (2013.01); *G06T 7/0028* (2013.01); *G06T 2207/10121* (2013.01); *G06T 2207/30021* (2013.01); *G06T 2207/30048* (2013.01); *G06T 2207/30204* (2013.01)

(58) Field of Classification Search
None
See application file for complete search history.

(56) References Cited

U.S. PATENT DOCUMENTS

| 7,225,012 B1* | 5/2007 | Susil et al. ............... 600/414 |
| 2003/0125622 A1* | 7/2003 | Schweikard et al. ......... 600/437 |

(Continued)

FOREIGN PATENT DOCUMENTS

| CN | 101721220 A | 6/2010 |
| JP | 2010-131371 | 6/2010 |

(Continued)

OTHER PUBLICATIONS

Timinger et al. "Motion Compensation for Interventional Navigation on 3D Static Roadmaps Based on an Affine Model and Gating." Physics in Medicine and Biology, Issue 49, 2004, pp. 719-732.*

(Continued)

*Primary Examiner* — Jon Chang
(74) *Attorney, Agent, or Firm* — Oblon, McClelland, Maier & Neustadt, L.L.P.

(57) ABSTRACT

According to one embodiment, a medical image processing apparatus includes an X-ray image obtaining unit, a marker detection unit, a contrast image generation unit and a display image generation unit. The X-ray image obtaining unit obtains X-ray contrast image data and X-ray fluoroscopic image data. The marker detection unit detects positions of a marker from the X-ray contrast image data, or the X-ray contrast image data and the X-ray fluoroscopic image data. The marker is attached to a device. The contrast image generation unit generates X-ray contrast image data for a combination with a movement correction making the positions of the marker be positions which can be regarded as a same position. The display image generation unit generates X-ray image data for a display by combining the X-ray contrast image data for the combination with the X-ray fluoroscopic image data.

7 Claims, 4 Drawing Sheets

(56) References Cited

U.S. PATENT DOCUMENTS

| | | | |
|---|---|---|---|
| 2007/0197905 A1* | 8/2007 | Timinger et al. | 600/424 |
| 2009/0198126 A1* | 8/2009 | Klingenbeck-Regn | 600/426 |
| 2009/0299174 A1* | 12/2009 | Wright et al. | 600/424 |
| 2010/0104167 A1 | 4/2010 | Sakaguchi et al. | |
| 2010/0160764 A1* | 6/2010 | Steinberg et al. | 600/407 |
| 2011/0164035 A1* | 7/2011 | Liao et al. | 345/419 |
| 2012/0143029 A1* | 6/2012 | Silverstein et al. | 600/374 |
| 2013/0231556 A1* | 9/2013 | Holsing et al. | 600/424 |

FOREIGN PATENT DOCUMENTS

| | | |
|---|---|---|
| JP | 2011-4966 | 1/2011 |
| JP | 2011-160978 | 8/2011 |
| WO | WO 2011/039673 A1 | 4/2011 |

OTHER PUBLICATIONS

Perrenot et al. "Motion Correction for Coronary Stent Reconstruction From Rotational X-ray Projection Sequences." IEEE Transactions on Medical Imaging, vol. 26, No. 10, Oct. 2007, pp. 1412-1423.*

Combined Chinese Office Action and Search Report issued Aug. 7, 2014 in Patent Application No. 201310042570.2 (with English translation of categories of cited documents).

* cited by examiner

MEDICAL IMAGE PROCESSING APPARATUS, MEDICAL IMAGE PROCESSING METHOD AND X-RAY IMAGING APPARATUS

CROSS REFERENCES TO RELATED APPLICATIONS

This application is based upon and claims the benefit of priority from Japanese Patent Application No. 2012-020391, filed Feb. 1, 2012; the entire contents of which are incorporated herein by reference.

FIELD

Embodiments described herein relate generally to a medical image processing apparatus, a medical image processing method, and an X-ray imaging apparatus.

BACKGROUND

In recent years, TAVI (Trans-catheter Aortic Valve Implantation) also referred as TAVR (Trans-catheter Aortic Valve Replacement) using a catheter attracts attention. The procedure in TAVI is performed in the operating room equipped with an X-ray imaging apparatus. That is, TAVI is the technique of placing an artificial valve in the heart of an object, with observing X-ray fluoroscopic images acquired in real time by an X-ray imaging apparatus.

In TAVI, it is important to place an artificial valve on an exact position with referring to X-ray fluoroscopic images. Specifically, it becomes a target to place an artificial valve so that the lower end of the artificial valve lies under the bottom of the original valve while the upper end of the artificial valve lies above the leaflet tip of the original valve and under the coronary arteries.

Then, a technique by which road map images of an object are displayed with an X-ray imaging apparatus is proposed as a technique which supports such TAVI. A road map image is an image made by overlapping a previously acquired X-ray contrast image of blood vessels with an X-ray fluoroscopic image acquired in real time.

In TAVI, contrast medium is generally injected into a blood vessel in advance of placing an artificial valve. Then, X-ray contrast images, on which blood vessels are enhanced blackly, are acquired. Next, in a state where a device such as a guide wire for blood vessel has been inserted, X-ray fluoroscopic images are acquired in real time as live images. Although a device can be seen on these X-ray fluoroscopic images, it is difficult to sight blood vessels.

Accordingly, an X-ray contrast image is used as a mask image, and road map images which are derived by combining the mask image with each of the live images by subtraction processing between the mask image and each of the live images can be generated and displayed. Consequently, a doctor can operate a device to place an artificial valve with referring to contrast blood vessels on the road map images.

Note that, road map images include 2D (two dimensional) road map images and 3D (three dimensional) road map images. A 2D road map image is displayed as a 2D image by 2D data acquisition to generate a 2D intermediate image. On the other hand, a 3D road map image is displayed as a 2D image by 2D data acquisition to generate a 3D intermediate image.

When road map images are generated as represented by imaging for TAVI, it is important to generate a more suitable mask image to display an image with an improved image quality. Note that, a road map image can be also generated by a medical image processing apparatus connected to an X-ray imaging apparatus as well as an image processing function provided with an X-ray imaging apparatus.

Accordingly, an object of the present invention is to provide a medical image processing apparatus, a medical image processing method, and an X-ray imaging apparatus which can display compound images with a more improved image quality using X-ray contrast image data and X-ray fluoroscopic image data of an object.

DETAILED DESCRIPTION

In general, according to one embodiment, a medical image processing apparatus includes an X-ray image obtaining unit, a marker detection unit, a contrast image generation unit and a display image generation unit. The X-ray image obtaining unit is configured to obtain X-ray contrast image data and X-ray fluoroscopic image data. The marker detection unit is configured to detect positions of a marker from the X-ray contrast image data, or the X-ray contrast image data and the X-ray fluoroscopic image data. The marker is attached to a device. The contrast image generation unit is configured to generate X-ray contrast image data for a combination with a movement correction making the positions of the marker be positions which can be regarded as a same position. The display image generation unit is configured to generate X-ray image data for a display by combining the X-ray contrast image data for the combination with the X-ray fluoroscopic image data.

Further, according to one embodiment, a medical image processing method includes: obtaining X-ray contrast image data and X-ray fluoroscopic image data; detecting positions of a marker from the X-ray contrast image data, or the X-ray contrast image data and the X-ray fluoroscopic image data; generating X-ray contrast image data for a combination with a movement correction making the positions of the marker be positions which can be regarded as a same position; and generating X-ray image data for a display by combining the X-ray contrast image data for the combination with the X-ray fluoroscopic image data. The marker is attached to a device.

Further, according to one embodiment, an X-ray imaging apparatus includes an X-ray image acquisition unit, a marker detection unit, a contrast image generation unit and a display image generation unit. The X-ray image acquisition unit is configured to acquire X-ray contrast image data and X-ray fluoroscopic image data. The marker detection unit is configured to detect positions of a marker from the X-ray contrast image data, or the X-ray contrast image data and the X-ray fluoroscopic image data. The marker is attached to a device. The contrast image generation unit is configured to generate X-ray contrast image data for a combination with a movement correction making the positions of the marker be positions which can be regarded as a same position. The display image generation unit is configured to generate X-ray image data for a display by combining the X-ray contrast image data for the combination with the X-ray fluoroscopic image data.

A medical image processing apparatus, a medical image processing method, and an X-ray imaging apparatus according to an embodiment of the present invention will be described with reference to the accompanying drawings.

Figure 1:
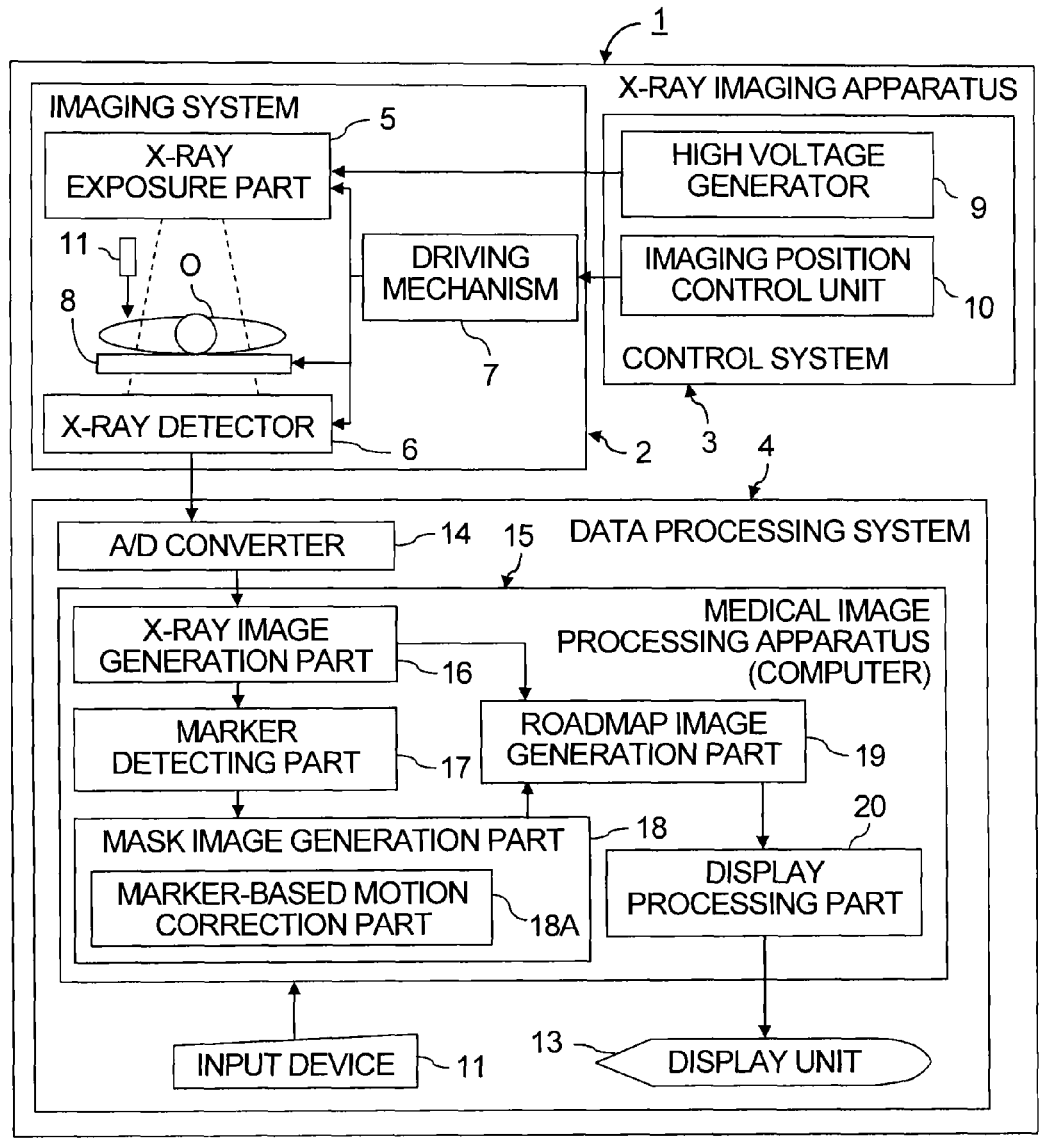
FIG. 1 is a configuration diagram of an X-ray imaging apparatus and a medical image processing apparatus according to an embodiment of the present invention.

FIG. 1 is a configuration diagram of an X-ray imaging apparatus and a medical image processing apparatus according to an embodiment of the present invention.

An X-ray imaging apparatus 1 includes an imaging system 2, a control system 3, and a data processing system 4. The imaging system 2 has an X-ray exposure part 5, an X-ray detector 6, a driving mechanism 7, and a bed 8. The control system 3 has a high voltage generator 9 and an imaging position control unit 10.

The X-ray exposure part 5 has an X-ray tube, and is placed opposite to the X-ray detector 6 so that the object O set on the bed 8 lies between the X-ray exposure part 5 and the X-ray detector 6. The X-ray exposure part 5 and the X-ray detector 6 can change the angle and relative position to the object O, with keeping their relative position, by the drive of the driving mechanism 7. Specifically, the X-ray exposure part 5 and the X-ray detector 6 are fixed to the both ends of a C-shaped arm having a rotation function. Then, the X-ray exposure part 5 is configured to expose an X-ray from a predetermined angle toward the object O with the X-ray tube while the X-ray detector 6 is configured to detect the X-ray transmitting the object O.

Moreover, the inclination and position of a top plate of the bed 8 can be adjusted with the driving mechanism 7. Therefore, the exposure direction of X-ray to the object O can be changed by adjusting the angle of the top plate as well as the angle of the X-ray exposure part 5 and the X-ray detector 6 to the object O.

Furthermore, near the object O set on the bed 8, a contrast medium injector 11 for injecting contrast medium into the object O is set up.

The high voltage generator 9 of the control system 3 is a unit which applies a high voltage to the X-ray tube of the X-ray exposure part 5 to expose an X-ray having a desired energy toward the object O. The imaging position control unit 10 is a unit which outputs a control signal to the driving mechanism 7 to control the driving mechanism 7. That is, the inclination and position of the top plate of the bed 8, and the rotation angle and position of the X-ray exposure part 5 and the X-ray detector 6 are controlled by the control signal output to the driving mechanism 7 from the imaging position control unit 10.

The data processing system 4 has an input device 12, a display unit 13, an A/D (analog to digital) converter 14, and a computer 15. The computer 15 functions as a medical image processing apparatus 15 by executing programs. That is, the medical image processing apparatus 15 is built in the X-ray imaging apparatus 1. However, an independent medical image processing apparatus having the similar function may be connected to the X-ray imaging apparatus 1 through a network. Moreover, circuits may be used for configuring the medical image processing apparatus 15 built in the X-ray imaging apparatus 1 or the medical image processing apparatus connected with the X-ray imaging apparatus 1 through a network.

The medical image processing apparatus 15 has an X-ray image generation part 16, a marker detecting part 17, a mask image generation part 18, a roadmap image generation part 19, and a display processing part 20. Moreover, the mask image generation part 18 has a marker based motion correction part 18A.

The X-ray image generation part 16 has a function to read digitized X-ray detection data from the X-ray detector 6 through the A/D converter 14 to generate 2D or 3D X-ray image data by data processing f the read X-ray detection data. Therefore, when X-ray image data is generated based on X-ray detection data acquired in a state where contrast medium has been injected into the object O, 2D or 3D X-ray contrast image data is obtained. Meanwhile, when X-ray image data is generated based on X-ray detection data acquired in the fluoroscopic mode without injecting contrast medium, 2D or 3D X-ray fluoroscopic image data is obtained. Moreover, in the fluoroscopic mode, live image data can be generated by generating X-ray fluoroscopic image data in real time based on X-ray detection data.

Therefore, the X-ray imaging apparatus 1 has a function as an X-ray image acquisition unit which acquires X-ray image data including X-ray contrast image data and X-ray fluoroscopic image data by collaboration of the X-ray image generation part 16 with the imaging system 2 and the control system 3.

The marker detecting part 17 has functions as an X-ray image obtaining unit which obtains X-ray image data such as X-ray contrast image data or X-ray fluoroscopic image data and a marker detection unit which detects positions of a marker, attached to a device inserted in the object O, from frames of X-ray image data. For a detection method of a marker, arbitrary image processing such as threshold processing of pixel values can be used.

In case of TAVI using the X-ray imaging apparatus 1, a catheter and an artificial valve are inserted into the heart of the object O. The catheter is inserted in order to inject contrast medium near the aortic valve. Then, in TAVI, the procedure is to place the artificial valve at the position of the aortic valve with observing X-ray images.

Figure 2:
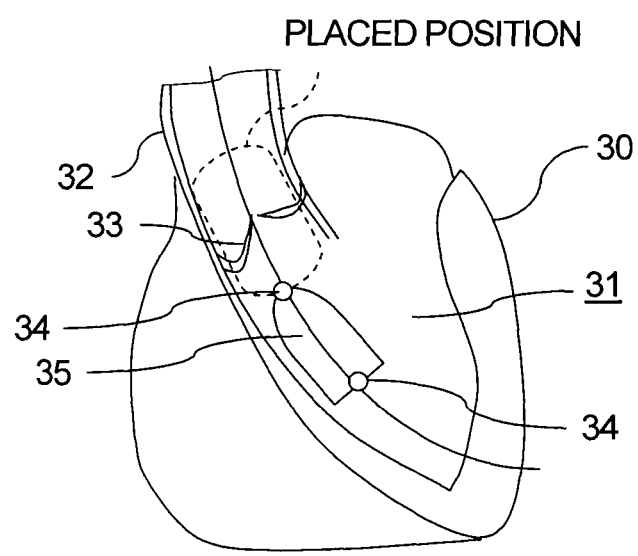
FIG. 2 is a view showing a placed position of an artificial valve in TAVI using the X-ray imaging apparatus shown in FIG. 1.

FIG. 2 is a view showing a placed position of an artificial valve in TAVI using the X-ray imaging apparatus 1 shown in FIG. 1.

As shown in FIG. 2, the aortic valve 33 lies in the blood outflow path from the LV (left ventricle) 31 of the heart 30 to the aorta 32. In the replacement of the aortic valve 33, procedure is to place the artificial valve 35 at the position of the original aortic valve 33 shown by a dotted line. More specifically, it becomes a target to place the artificial valve 35 so that the lower end of the artificial valve 35 lies under the bottom of the aortic valve 33 and the upper end of the artificial valve 35 lies above the leaflet tip of the aortic valve 33 and under the coronary arteries.

However, the heart 30 and the aorta 32 are not depicted on X-ray fluoroscopic images although devices, such as the artificial valve 35 and a catheter, are depicted. Then, a catheter is inserted near the aorta 32 to inject contrast medium from the contrast medium injector 11 in advance of placing the artificial valve 35. Subsequently, X-ray contrast images on which blood vessels have been enhanced blackly are acquired by imaging the heart 30 in a state where the contrast medium has been injected. Thereby, a doctor can grasp the position of the aortic valve 33.

Moreover, markers 34 for X-ray imaging can be attached to devices, such as the artificial valve 35 and a catheter. Therefore, when X-ray contrast images or X-ray fluoroscopic images are acquired, the markers 34 attached to a device are depicted clearly. Note that the artificial valve 35 to which two markers 34 are attached is shown in FIG. 2.

The marker can be made by a matter which presents a CT value higher than that of a reference matter around an imaging part. For example, it is practical to constitute the marker by a material which has a CT value higher than the CT value of bones.

The main artery which is the placing target of an artificial valve moves due to the beat. Therefore, the artificial valve and the catheter inserted near the aortic valve also move together with the main artery. For this reason, when frames of X-ray image data are acquired sequentially, the positions of the device on the respective frames of the X-ray image data become mutually different positions under the influence of the motion by the beat.

Then, the marker detecting part 17 is configured to detect positions of each marker of a device on frames of X-ray image data acquired at mutually different timings for a motion correction. That is, the marker detecting part 17 has a function to detect positions of each marker attached to a device, from X-ray contrast image data or from X-ray contrast image data and X-ray fluoroscopic image data.

As mentioned above, in TAVI, a single frame or frames of X-ray contrast image data are acquired in advance of placing the artificial valve. When the artificial valve is placed, frames of X-ray fluoroscopic image data are acquired sequentially in real time as live image data.

Therefore, when the marker detecting part 17 has obtained frames of X-ray contrast image data, the marker detecting part 17 detects positions of each marker on the frames of the X-ray contrast image data. Meanwhile, when the marker detecting part 17 has obtained frames of X-ray fluoroscopic image data, acquired sequentially as live image data, in real time, the marker detecting part 17 is configured to detect a position of each marker from a single frame of the X-ray fluoroscopic image data acquired before an operation period of the artificial valve as a device.

Typically, the position of each marker is detected from the first frame of the X-ray fluoroscopic image data. However, in case of performing pacing which inserts a pacemaker in the heart so as to beat at a high velocity of about 200 beat per minutes, it is preferred to detect the position of each marker from the first frame of the X-ray fluoroscopic image data after the pacing started.

Moreover, when the marker detecting part 17 is to detect the position of each marker from X-ray fluoroscopic image data, the marker detecting part 17 is configured to detect the position of each marker from at least one frame of X-ray contrast image data as well. That is, the marker detecting part 17 is configured to detect a position of each marker from each of X-ray contrast image data and X-ray fluoroscopic image data.

The mask image generation part 18 has a function as a contrast image generation unit which generates X-ray contrast image data for the composition to X-ray fluoroscopic image data based on a single frame or frames of X-ray contrast image data generated in the X-ray image generation part 16. Typically, the X-ray contrast image data for the composition is compounded with X-ray fluoroscopic image data by subtraction processing between the X-ray contrast image data for the composition and the X-ray fluoroscopic image data. Therefore, the X-ray contrast image data for the composition to X-ray fluoroscopic image data is called mask image data here.

The marker based motion correction part 18A of the mask image generation part 18 has a function to perform a motion correction between frames of X-ray image data so as to make positions of a marker, detected by the marker detecting part 17, be positions which can be regarded as a same position.

Therefore, motion correction processing includes coordinate conversion processing which converts each coordinate system of frames of X-ray image data into a coordinate system fixed to a marker.

More specifically, when frames of X-ray contrast image data have been generated for generation of mask image data in the X-ray image generation part 16 and positions of each marker on the frames of the X-ray contrast image data have been detected by the marker detecting part 17, the marker based motion correction part 18A is configured to perform the motion correction of the frames of the X-ray contrast image data so as to make the positions of each marker, on the frames of the X-ray contrast image data, be positions which can be regarded as a same position. In this case, the mask image generation part 18 is configured to generate one frame of mask image data based on the frames of the X-ray contrast image data after the motion correction.

As image processing for generating one frame of mask image data based on frames of X-ray contrast image data, projection processing such as MinIP (minimum intensity projection) processing can be used.

Moreover, the marker based motion correction part 18A has a function to perform a motion correction between X-ray contrast image data and X-ray fluoroscopic image data so as to make positions of a marker be positions which can be regarded as a same position. Therefore, when frames of X-ray contrast image data have been acquired, it is practical to generate one frame of X-ray contrast image data by image processing such as projection processing to perform the motion correction between the one frame of the X-ray contrast image data and one predesignated frame of X-ray fluoroscopic image data. In this case, the mask image generation part 18 is configured to set the one frame of the X-ray contrast image data after the motion correction to the mask image data.

On the other hand, when one frame of X-ray contrast image data has been acquired, the motion correction is performed between the acquired frame of the X-ray contrast image data and one predesignated frame of X-ray fluoroscopic image data. In this case, the mask image generation part 18 is also configured to set the one frame of the X-ray contrast image data after the motion correction to the mask image data.

The roadmap image generation part 19 has a function as a display image generation unit which generates road map image data as 2D X-ray image data for a display by compounding the mask image data generated in the mask image generation part 18 with each of frames of X-ray fluoroscopic image data acquired sequentially in real time as live image data.

The display processing part 20 has a function to output road map image data generated in the roadmap image generation part 19 and X-ray image data generated in the elements, such as the X-ray image generation part 16, in the medical image processing apparatus 15, to the display unit 13. At this time, the display processing part 20 is configured to perform necessary display processing, such as processing for generating 2D data, of X-ray image data to be displayed.

Next, operation and action of the X-ray imaging apparatus 1 will be described.

Figure 3:
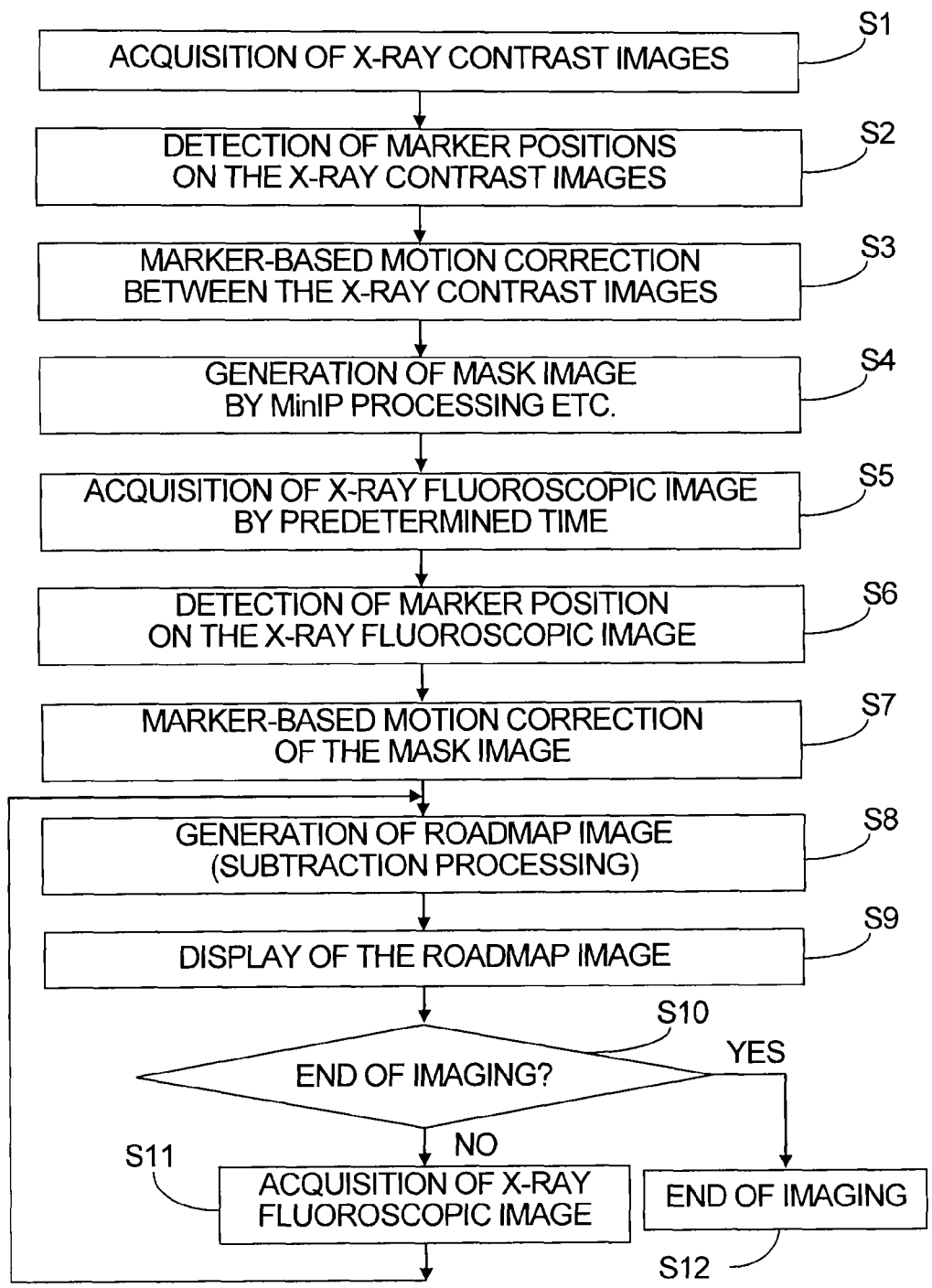
FIG. 3 is a flowchart which shows a flow for TAVI using the X-ray imaging apparatus shown in FIG. 1.
Figure 4:
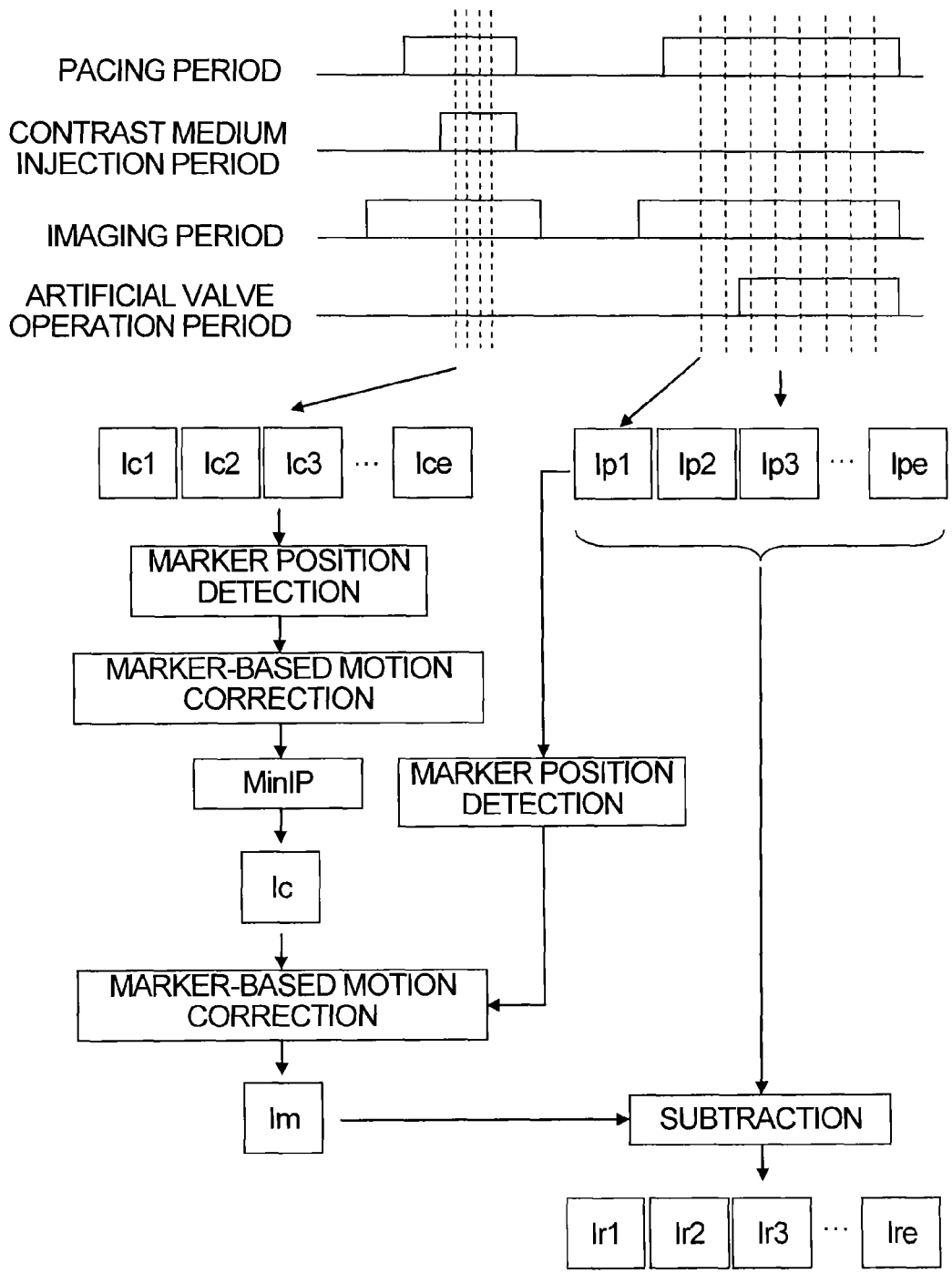
FIG. 4 is a diagram explaining a generation method of road map image data in the X-ray imaging apparatus shown in FIG. 1.

FIG. 3 is a flowchart which shows a flow for TAVI using the X-ray imaging apparatus 1 shown in FIG. 1. FIG. 4 is a diagram explaining a generation method of road map image data in the X-ray imaging apparatus 1 shown in FIG. 1.

First, the object O is set on the top plate of the bed 8. Then, the driving mechanism 7 drives under a control signal from the imaging position control unit 10. Thereby, the inclination and position of the top plate of the bed 8, and the rotation angle and position of the X-ray exposure part 5 and the X-ray detector 6 are adjusted according to heart imaging.

Subsequently, X-ray images, such as balloon images, referred to in advance of TAVI are acquired and displayed, as needed. Moreover, a catheter and an artificial valve are inserted to near the aortic valve of the object O. At least one marker is previously attached to at least one of the inserted catheter and artificial valve.

Next, in step S1, X-ray contrast image data is acquired. For that purpose, pacing and injection of contrast medium are performed. Generally, the pacing is started after imaging started like the chart shown in the upper part of FIG. 4.

This pacing is carried out when the aortic valve is dilated. When the pacing is performed, the discharge function of the heart is restricted temporarily. For this reason, the gap in pressure near the aortic valve is almost lost. As a result, a situation where a device such as the artificial valve flows downstream can be avoided when the aortic valve is dilated. Note that, the heart moves slightly even in the pacing.

Furthermore, contrast medium is injected from the contrast medium injector 11 through the catheter after the pacing. Then, frames of X-ray image data acquired in the respective timings, shown by the dotted lines, during the contrast medium injection period are obtained as frames of X-ray contrast image data Ic1, Ic2, Ic3, . . . , Ice.

Acquisition of the X-ray image data is performed by the operation of the imaging system 2 under the control by the control system 3 and data processing in the data processing system 4. Specifically, a high voltage is applied to the X-ray tube of the X-ray exposure part 5 from the high voltage generator 9. Consequently, an X-ray is exposed towards the imaging region involving the heart of the object O from the X-ray exposure part 5. Then, the X-ray which transmitted the object O is detected by the X-ray detector 6.

Subsequently, X-ray detection signals are output from the X-ray detector 6 to the medical image processing apparatus 15 through the A/D converter 14. Thereby, the digitized X-ray detection data is obtained in the X-ray image generation part 16 of the medical image processing apparatus 15. Then, the X-ray image generation part 16 generates 2D or 3D X-ray image data by known data processing of the X-ray detection data.

Since the contrast medium has been injected into the object O in the imaging period, the X-ray image data is X-ray contrast image data. Therefore, the X-ray contrast image data depicting blood vessels blackly is generated. On this X-ray contrast image data, the catheter and the artificial valve to which the markers have been attached are also depicted.

The X-ray contrast image data is acquired for generation of mask image data to generate road map image data as well as observation of the form of the main artery and the like. The mask image data can be generated based on a single frame or frames of the X-ray contrast image data.

That is, X-ray contrast image data for one frame can be acquired to use the acquired X-ray contrast image data as the mask image data. Alternatively, X-ray contrast image data for plural frames can be also acquired to use one frame of X-ray contrast image data, selected from the acquired frames of the X-ray contrast image data, as the mask image data.

However, it is desirable to acquire frames of X-ray contrast image data to generate one frame of the mask image data using the acquired frames of the X-ray contrast image data from a viewpoint of obtaining an enhancing effect by contrast medium satisfactorily. Therefore, an example case where one frame of the mask image data is generated using frames of X-ray contrast image data as shown in FIG. 4 will be described here.

Moreover, intermediate image data, such as mask image data, used for generation of 2D road map image data may be 2D or 3D.

When frames of X-ray contrast image data are acquired, influence of the beat arises since acquisition times of the respective frames of the X-ray contrast image data differ mutually. That is, the aorta moves by the beat, and the artificial valve and the catheter are also to move under the influence of a motion of the aorta. Therefore, a position of each marker attached to the artificial valve and the catheter becomes mutually different positions in the frames of the X-ray contrast image data because of the influence of the beat.

Next, in step S2, the marker detecting part 17 acquires the X-ray contrast image data to detect a position of each marker on each frame of the X-ray contrast image data. Each position of a marker can be detected by arbitrary image processing such as threshold processing of pixel values.

The devices, such as the catheter and the artificial valve, to which one or more markers have been attached have been inserted near the aortic valve in the acquisition period of the X-ray contrast image data. Therefore, the devices including the catheter and the artificial valve move in synchronized with the aorta under the influence of the beat. For this reason, it can be considered that each the motions of the catheter, the artificial valve, and each marker is equivalent to the motion of the aorta. Therefore, the motion of the aorta can be acquired indirectly by detection of a position of at least one marker.

Note that, although structural objects, such as a bone, are also depicted on the frames of the X-ray contrast image data, they move without synchronizing with the aorta.

Next, in step S3, the motion correction on the basis of the positions of each marker between the frames of the X-ray contrast image data is performed. Specifically, the marker based motion correction part 18A of the mask image generation part 18 performs the motion correction between the frames of the X-ray contrast image data so that positions of a marker detected by the marker detecting part 17 become positions which can be regarded as a same position.

Thereby, the time series X-ray contrast image data in which each marker is motionless is generated. Since each marker has a motion equivalent to that of the aorta as mentioned above, the X-ray contrast image data after the motion correction become the time series frames of X-ray contrast image data in which the aorta is almost motionless.

Next, in step S4, the mask image generation part 18 generates the mask image data from the frames of the X-ray contrast image data by MinIP processing or the like. The generated mask image data is a single frame of X-ray contrast image data Ic as shown in FIG. 4.

When MinIP processing is performed, image data of which pixel values are the minimum values of the frames of the X-ray contrast image data is obtained. For this reason, sharp mask image data can be generated. In addition, even if enhanced conditions by the contrast medium are not uniform between the respective frames of the X-ray contrast image data, uniformity in the enhanced conditions by the contrast medium can be improved by generating MinIP image data of the frames of the X-ray contrast image data. As a result, mask image data suitable for generation of road map image data can be generated.

When the required number of frames of the X-ray contrast image data have been acquired, the injection of the contrast medium and pacing are stopped. After the contrast imaging is completed, a doctor becomes possible to start placing the artificial valve. For that purpose, acquisition of X-ray fluoroscopic image data is usually started after 30 seconds to several minutes.

Next, in step S5, X-ray fluoroscopic image data by a predetermined time is acquired. For that purpose, acquisition of the X-ray fluoroscopic image data and pacing are started. A flow of the acquisition of the X-ray fluoroscopic image data is similar to that of the acquisition of the X-ray contrast image data.

A doctor waits without moving the artificial valve until a predetermined frame of the X-ray fluoroscopic image data is acquired. Therefore, by determining a time, when the first frame of the X-ray fluoroscopic image data is acquired, as the predetermined time, the influence on the procedure by the waiting time of the doctor can be reduced as much as possible since the waiting time becomes about 30 seconds to several minutes. However, it is important to set a time, when the frame of the X-ray fluoroscopic image data after the pacing started is acquired, as the predetermined time.

FIGS. 4 shows an example where the period in which the artificial valve is not moved is till at least the first frame of the X-ray fluoroscopic image data Ip1 after the pacing is acquired.

Next, in step S6, the marker detecting part 17 acquires the X-ray fluoroscopic image data corresponding to the predetermined time to detect a position of each marker on the X-ray fluoroscopic image data. In the example shown in FIG. 4, the position of each marker on the first frame of the X-ray fluoroscopic image data Ip1 is detected.

Next, in step S7, the marker based motion correction part 18A performs the motion correction on the basis of the marker position on the mask image data generated in step S4. That is, there is an interval of about 30 seconds to several minutes between the contrast imaging and the fluoroscopic imaging. For this reason, the motion by respiration and/or body motion arises in the object O. As a result, a nonnegligible position gap may arise between the mask image data and the X-ray fluoroscopic image data.

Accordingly, the mask image data is corrected using a marker as a reference so that the position of the marker detected from the X-ray fluoroscopic image data corresponding to the predetermined frame, such as the first frame, becomes the same position as that on the mask image data. Note that, the X-ray fluoroscopic image data may be corrected. Thereby, the motion, by respiration and the other factors, between the contrast imaging and the fluoroscopic imaging can be corrected.

Then, the mask image data Im after the motion correction can be used as image data for generation of road map image data as shown in FIG. 4.

Next, in step S8, the roadmap image generation part 19 generates 2D road map image data for a display by compounding the mask image data with the X-ray fluoroscopic image data. Specifically, the first frame of the road map image data Ir1 is generated by subtraction processing of the mask image data Im after the motion correction and the first frame of the X-ray fluoroscopic image data Ip1 as shown in FIG. 4.

Next, in step S9, the roadmap image generation part 19 outputs the generated road map image data to the display unit 13. As a result, the first frame of the road map image is displayed on the display unit 13.

Since this road map image is a compounded image of the X-ray contrast image and the X-ray fluoroscopic image, the aorta and the artificial valve, which have been contrast-enhanced, are depicted. Therefore a doctor becomes possible to place the artificial valve with reference to the road map image.

The artificial valve is placed by moving the artificial valve, deciding the placed position and dilating the artificial valve at the decided placed position. Therefore, during placing the artificial valve, the artificial valve and each marker move against the aorta. For this reason, the motion correction on the basis of a position of a marker cannot be performed after moving the artificial valve.

Accordingly, when X-ray fluoroscopic images are acquired, the motion correction on the basis of a position of a marker detected from the predetermined frame of the X-ray fluoroscopic image data acquired before beginning to move the artificial valve is performed as mentioned above. Note that, the motion correction of the mask image data may be performed using a representing value of positions of a marker detected from frames of X-ray fluoroscopic image data acquired before beginning to move the artificial valve.

On the contrary, after the X-ray fluoroscopic image for the motion correction of the mask image data has been acquired, it becomes possible to move the artificial valve. Then, the acquisition of the X-ray fluoroscopic image data in step S11, the generation of the road map image data in step S12, and the display of the road map image in step S3 are repeated until it is determined that the imaging has been completed in the determination whether the imaging has been completed or not in step S10.

Consequently, time series frames of the road map image data Ir1, Ir2, Ir3, . . . , Ire are generated by subtracting the mask image data Im from each of the time series frames of the X-ray fluoroscopic image data Ip1, Ip2, Ip3, Ipe acquired as live image data as shown in FIG. 4.

Therefore, after observing the road map image corresponding to the first frame of the X-ray fluoroscopic image data Ip1, a doctor can place the artificial valve at the predetermined position by moving and dilating the artificial valve with referring to the subsequent road map images. Note that, a doctor may practically operate the artificial valve after acquisition of the first several frames of the X-ray fluoroscopic image data as shown in FIG. 4.

When placing the artificial valve has been completed, the instruction for imaging completion is input to the control system 3. Then, the X-ray imaging apparatus 1 determines that the imaging has been completed, in the determination in step S10. Therefore, the X-ray imaging apparatus 1 completes the imaging in step S12.

Note that, in the above-mentioned example, the pacing may be omitted from one of or both the acquisition period of the X-ray contrast image data and that of the X-ray fluoroscopic image data.

That is, the X-ray imaging apparatus 1 as described above is an apparatus configured to perform the motion correction between images using a marker, attached to a device such as an artificial valve inserted near the aortic valve, as a reference.

Therefore, according to the X-ray imaging apparatus 1, the mask image data used for generation of the road map image data can be generated in an improved accuracy. Conventionally, the road map image data is used for the medical treatment of specific internal organs. In order to generate the road map image data, it is necessary to select one frame of image data, from continuously acquired frames of image data, as mask image data or generate a single frame of image data by MinIP processing from the acquired frames of image data.

In TAVI, the aorta to be an imaging target has the features that it is thick and has a fast blood flow. For this reason, in order to enhance the aorta uniformly and sufficiently, a large amount of contrast medium is needed. Accordingly, in order to suppress the consumption of contrast medium, the aorta may not be enhanced enough and uniformly in fact. In addition, the aorta has the specific characteristic to move irregularly under the influence of beat as well as pacing. Therefore, if MinIP processing is merely performed to generate mask image data of the aorta, blurs arise in the mask image data.

On the other hand, according to the X-ray imaging apparatus 1, the motion correction of X-ray contrast image data can be performed using a marker which moves in synchronization with the aorta. For this reason, even if MiniIP processing is applied to frames of X-ray contrast image data, blurs can be suppressed. Therefore, sharp mask image data enhanced enough and uniformly by the contrast medium can be generated based on angiographic contrast images. As a result, it becomes possible to generate and display road map image data with an improved image quality.

In addition, in case of TAVI, the bed 8 or the object O may move during an interval between X-ray contrast imaging and X-ray fluoroscopy imaging. For this reason, a possibility that a position gap arises between mask image data and X-ray fluoroscopic image data is high. On the other hand, it is important to make the position of an imaging target constant in order to generate road map image data with an improved image quality. Accordingly, when mask image data is merely compounded with X-ray fluoroscopic image data, unclear road map image data may be generated.

On the contrary, according to the X-ray imaging apparatus 1, a marker which moves in synchronization with the aorta can be used to correct the position gap between mask image data and X-ray fluoroscopic image data. Therefore, road map image data can be generated with a more improved image quality.

That is, according to the X-ray imaging apparatus 1, it becomes possible to generate and display road map image data with regard to an imaging target, which has a motion, as represented by the aortic valve, with an improved image quality, which has been conventionally considered to be difficult. Specifically, road map image data can be generated and displayed with an improved image quality with targeting an internal organ which moves by various factors such as a motion of the object O, breathing, a motion of the heart, pacing, a motion of a device, and movement of the bed 8.

Therefore, though a case where the X-ray imaging apparatus 1 is used for TAVI which places the artificial valve on the position of the aortic valve was shown in the above-mentioned example, a generation and display of road map image data using the X-ray imaging apparatus 1 are possible similarly in various procedures such as a valve replacement procedure for a various valve like a mitral valve, placing a pacemaker, medical treatment of a septal defect, or a procedure using a graft for LAA occlusion (left atrial appendage occlusion). That is, when an object moving by beat is imaged, the generation of road map image data with the motion correction based on a marker as a reference can be performed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
   processing circuitry configured to
      obtain X-ray contrast image data and time-series frames of X-ray fluoroscopic image data,
      detect a first position of a marker from the X-ray contrast image data and a second position of the marker from a frame of the X-ray fluoroscopic image data, the marker being attached to a device,
      to generate corrected X-ray contrast image data as mask image data, to be combined with each of the time-series frames of the X-ray fluoroscopic image data, with a movement correction between the X-ray contrast image data and the frame of the X-ray fluoroscopic image data, the first position after the movement correction being regarded to be same as the second position after the movement correction, and
      generate frames of X-ray image data for a display by combining the corrected X-ray contrast image data with each of the time-series frames of the X-ray fluoroscopic image data.

2. The medical image processing apparatus of claim 1, wherein said processing circuitry is configured to
   detect plural positions of the marker on frames of the X-ray contrast image data, and
   perform another movement correction of the frames of the X-ray contrast image data and generate the corrected X-ray contrast image data based on frames of X-ray contrast image data after the another movement correction, each of the plural positions after the another movement correction being regarded to be same as another position of the plural positions after the another movement correction.

3. The medical image processing apparatus of claim 1, wherein said processing circuitry is configured to detect the second position of the marker from a frame of X-ray fluoroscopic image data acquired before a period during which the device is manipulated.

4. The medical image processing apparatus of claim 1, wherein said processing circuitry is configured to obtain frames of X-ray fluoroscopic image data acquired sequentially as live image data in real time.

5. The medical image processing apparatus of claim 1, wherein the marker is attached to an artificial valve inserted near an aortic valve.

6. A medical image processing method comprising:
   obtaining X-ray contrast image data and time-series frames of X-ray fluoroscopic image data;
   detecting a first position of a marker from the X-ray contrast image data and a second position of the marker from a frame of the X-ray fluoroscopic image data, the marker being attached to a device;
   generating corrected X-ray contrast image data as mask image data, to be combined with each of the time-series frames of the X-ray fluoroscopic image data, with a movement correction between the X-ray contrast image data and the frame of the X-ray fluoroscopic image data, the first position after the movement correction being regarded to be same as the second position after the movement correction; and
   generating frames of X-ray image data for a display by combining the corrected X-ray contrast image data with each of the time-series frames of the X-ray fluoroscopic image data.

7. An X-ray imaging apparatus comprising:
   an imaging system including an X-ray tube and an X-ray detector, for acquiring X-ray contrast image data and time-series frames of X-ray fluoroscopic image data; and
   processing circuitry configured to
      detect a first position of a marker from the X-ray contrast image data and a second position of the marker from a frame of the X-ray fluoroscopic image data, the marker being attached to a device, generate corrected X-ray contrast image data as mask image data, to be combined with each of the time-series frames of the X-ray fluoroscopic image data, with a movement correction between the X-ray contrast image data and the frame of the X-ray fluoroscopic image data, the first position after the movement correction being regarded to be same as the second position after the movement correction, and generate frames of X-ray image data for a display by combining the corrected X-ray contrast image data with each of the time-series frames of the X-ray fluoroscopic image data.

* * * * *